(12) United States Patent
Thorpe et al.

(10) Patent No.: US 8,628,141 B1
(45) Date of Patent: Jan. 14, 2014

(54) CLOSURE RESTRAINT SYSTEM WITH CAMMING SELF ADJUSTMENT

(71) Applicant: GM Global Technology Operations LLC, Detroit, MI (US)

(72) Inventors: Scott W. Thorpe, Milford, MI (US); Richard D. Janke, Holly, MI (US); Altaf S. Imam, Troy, MI (US); Shawn G. Quinn, Grand Blanc, MI (US); Michael E. McGuire, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/659,984

(22) Filed: Oct. 25, 2012

(51) Int. Cl.
*B60N 99/00* (2006.01)

(52) U.S. Cl.
USPC ........ 296/207; 248/188.2; 248/548; 248/909; 180/69.2

(58) Field of Classification Search
USPC ........... 296/76, 106, 146.1, 207; 49/392, 393; 248/188.2, 544, 548, 649, 900, 909; 180/69.2; 52/126.1; 254/140, 42
See application file for complete search history.

(56) References Cited

U.S. PATENT DOCUMENTS

| | | | | |
|---|---|---|---|---|
| 5,584,528 A * | 12/1996 | Cozzani | ..................... | 296/207 |
| 5,992,927 A * | 11/1999 | Scroggie | ..................... | 296/207 |
| 6,676,201 B2 * | 1/2004 | Im et al. | ..................... | 296/207 |
| 7,014,258 B2 * | 3/2006 | Schubring et al. | ............. | 296/207 |
| 7,850,229 B2 * | 12/2010 | Ihashi et al. | ................. | 296/207 |
| 2005/0093342 A1 * | 5/2005 | Kim | ............................. | 296/207 |

* cited by examiner

*Primary Examiner* — Lori Lyjak
(74) *Attorney, Agent, or Firm* — Quinn Law Group, PLLC

(57) ABSTRACT

A vehicle includes a body and a closure panel moveably attached to the body. When the closure panel is in a closed position, a closure restraint system interconnects the body and the closure panel and restricts lateral movement of the closure panel relative to the body. The closure restraint system includes a fixed wedge block attached to one of the body and the closure panel, and a rotatable wedge block attached to the other of the body and the closure panel. The rotatable wedge block includes a curved cam surface, and is rotatable about a rotation axis relative to the fixed wedge block when engaged by the fixed wedge block to move the contact between the fixed wedge block and the rotatable wedge block along the curved cam surface to maintain a consistent closing force for closing the closure panel.

20 Claims, 3 Drawing Sheets

CLOSURE RESTRAINT SYSTEM WITH CAMMING SELF ADJUSTMENT

TECHNICAL FIELD

The invention generally relates to a closure restraint system for restricting lateral movement of a closure panel of a vehicle relative to a body of the vehicle when the closure panel is disposed in a closed position.

BACKGROUND

Vehicles include moveable panels for sealing openings in a body of the vehicle. The moveable panels may include but are not limited to a lift gate for sealing a rear opening of a Sport Utility Vehicle (SUV), a decklid for sealing a trunk space of a sedan, a hatch for sealing a rear opening of a hatchback, a hood for sealing an engine compartment, or a side door for sealing a passenger compartment. It should be appreciated that the opening and the moveable panel may be located anywhere on the vehicle, and may be positioned in any suitable orientation.

A closure assembly secures the moveable panel relative to the body of the vehicle. The closure assembly may include a striker assembly and a latch mechanism. Typically, the striker assembly is attached to the body, and the latch mechanism is attached to and moveable with the panel. However, the relative positions of the striker assembly and the latch mechanism may be reversed. The striker assembly includes a wire striker, which generally forms a loop. The panel and the latch mechanism move along a path into and out of engagement with the striker assembly. The latch mechanism engages the wire striker of the striker assembly in interlocking engagement to secure the panel relative to the body. Some closure assemblies, while securing the moveable panel against movement along the path relative to the body, allow some movement of the moveable panel relative to the body. The moveable panel may move in a direction transverse to the path, i.e., side to side, and may also move in a fore/aft direction, i.e., in an axial or longitudinal direction along the path. This lateral and/or longitudinal movement should be restricted to prevent the moveable panel from contacting the body and causing undesirable noise, paint chips, etc.

SUMMARY

A vehicle is provided. The vehicle includes a body defining an opening, and a closure panel moveably attached to the body for movement along a path between an open position and a closed position. A closure restraint system interconnects the body and the closure panel. The closure restraint system restricts lateral movement of the closure panel relative to the body when the closure panel is disposed in the closed position. The closure restraint system includes a fixed wedge block and a rotatable wedge block. The fixed wedge block is attached to one of the body or the closure panel, and the rotatable wedge block is attached to the other of the body and the closure panel. For example, the fixed wedge block may be attached to and moveable with the closure panel, with the rotatable wedge block attached to the body. Alternatively, it should be appreciated that the relative positions of the fixed wedge block and the rotatable wedge block may be reversed, with the fixed wedge block attached to the body, and the rotatable wedge block attached to and moveable with the closure panel. The fixed wedge block and the rotatable wedge block engage each other during the movement of the closure panel relative to the body to restrict lateral movement of the closure panel relative to the body in a direction transverse to the path. The rotatable wedge block is rotatable relative to the fixed wedge block about a rotation axis disposed perpendicular to the path when engaged by the fixed wedge block.

A closure restraint system for interconnecting a body of a vehicle relative to a closure panel of the vehicle is also provided. The closure restraint system restricts lateral movement of the closure panel relative to the body when the closure panel is disposed in a closed position. The closure restraint system includes a rotatable wedge block and a fixed wedge block. The rotatable wedge block includes a first contact surface, and is configured for attachment to one of the body and the closure panel. The fixed wedge block includes a second contact surface, and is configured for attachment to the other of the body and the closure panel. The second contact surface of the fixed wedge block and the first contact surface of the rotatable wedge block engage each other during movement of the closure panel along a path relative to the body to restrict lateral movement of the closure panel relative to the body in a direction transverse to the path. The rotatable wedge block is rotatable relative to the fixed wedge block about a rotation axis disposed perpendicular to the path, when engaged by the fixed wedge block. One of the first contact surface and the second contact surface defines a curved cam surface that is disposed perpendicular to the rotation axis. The curved cam surface is shaped to maintain a consistent resultant force. The consistent resultant force resists movement of the closure panel relative to the body as the rotatable wedge block rotates about the rotation axis.

Accordingly, the closure restraint system restricts movement of the closure panel relative to the body to prevent the moveable panel from contacting the body, thereby preventing undesirable noise, paint chips, etc. The rotation of the rotatable wedge block moves the fixed wedge block along the curved cam surface of the rotatable wedge block to maintain a consistent closing force required to move the closure panel into the closed position.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
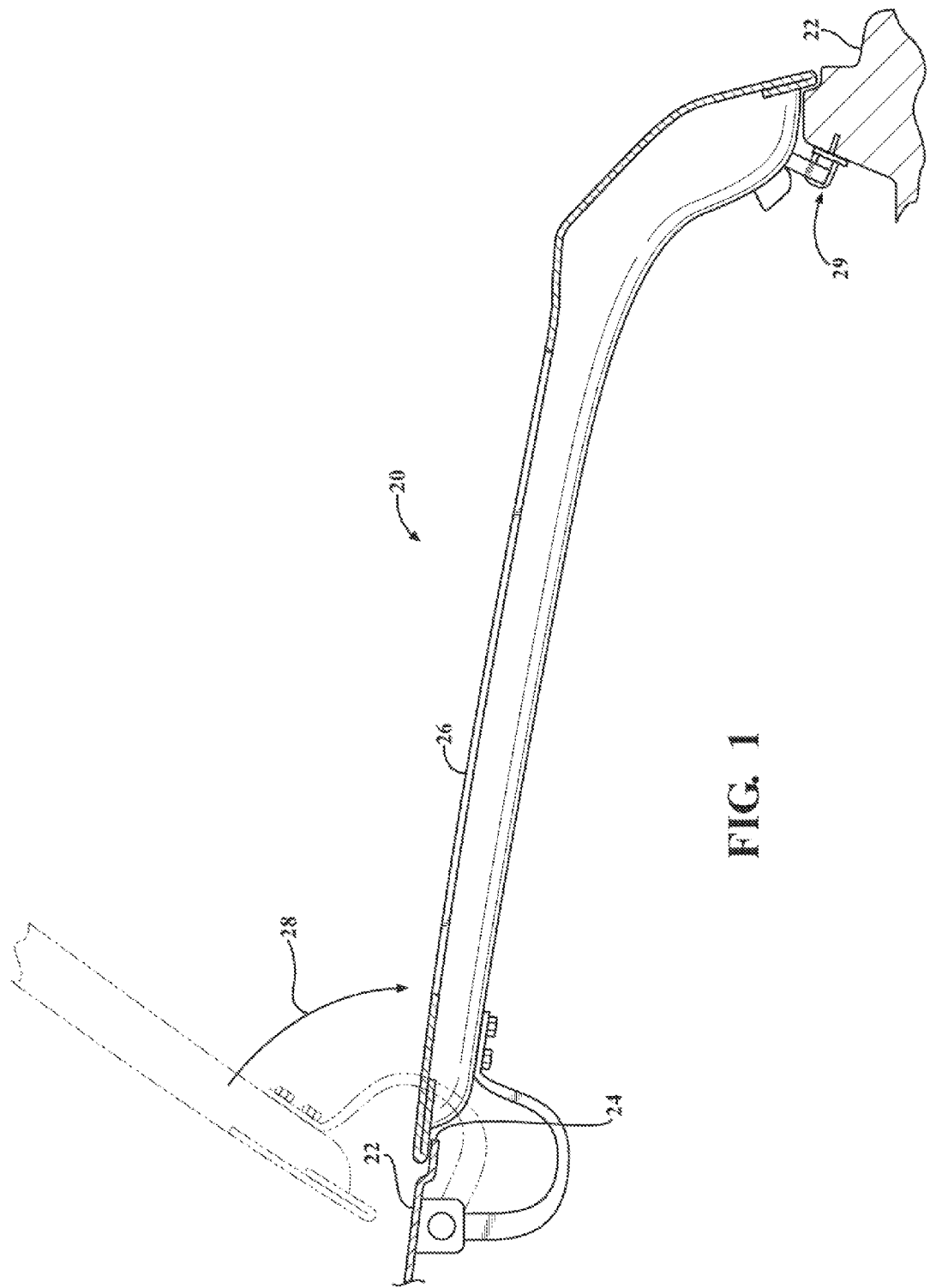
FIG. 1 is a schematic cross sectional view of a vehicle.

Referring to the Figures, wherein like numerals indicate like parts throughout the several views, a vehicle is generally shown at 20. Referring to FIG. 1, the vehicle 20 includes a structure, i.e., a body 22, which defines an opening 24. The opening 24 may include, for example, a rear access to a cargo van or a sport utility vehicle 20, or a trunk to a sedan. It should be appreciated that the opening 24 may be located and oriented in any position on the body 22 of the vehicle 20. A closure panel 26 is moveably attached to the body 22, for example, by one or more hinges. The closure panel 26 moves along a path 28 between an open position (shown in phantom lines in FIG. 1) to allow access to the opening 24, and a closed position (shown in solid lines in FIG. 1) to selectively seal the opening 24. The panel may include, for example, a deck lid, a lift gate, a hatch back, a door, or some other panel.

Figure 2:
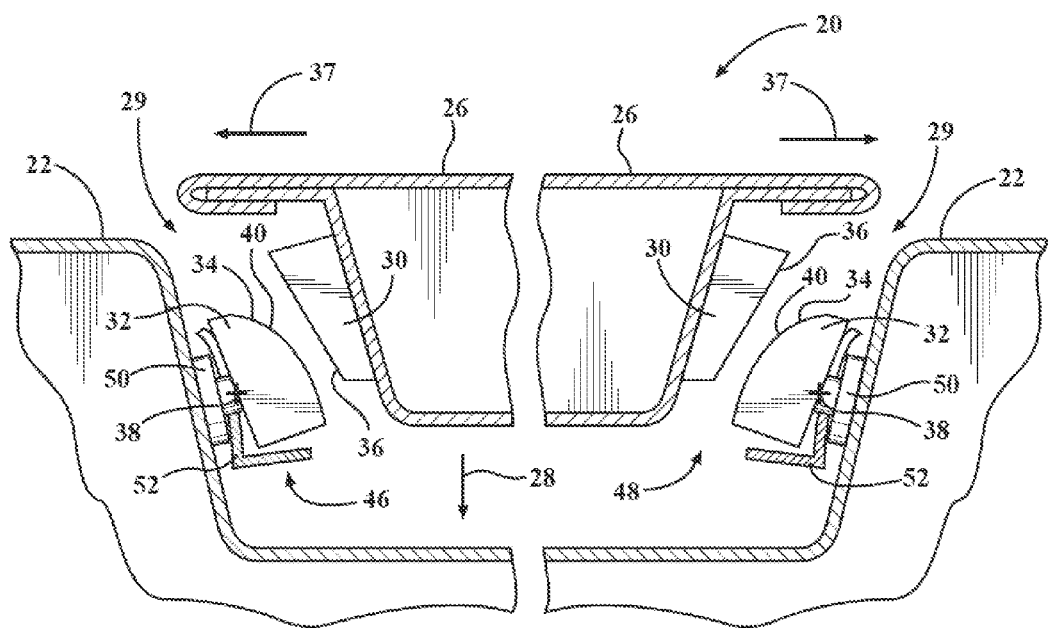
FIG. 2 is a schematic cross sectional view of the vehicle perpendicular to the view of FIG. 1 showing a closure panel in an open position.
Figure 3:
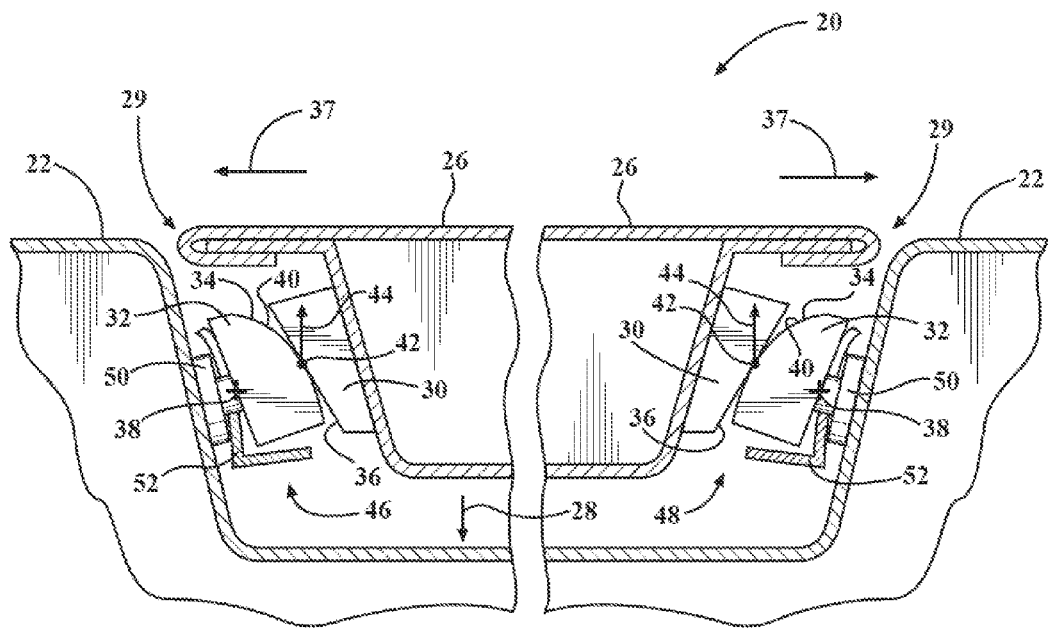
FIG. 3 is a schematic cross sectional view of the vehicle perpendicular to the view of FIG. 1 showing the closure panel moving along a path into a closed position, with a fixed wedge block and a rotatable wedge block of a closure restraint system contacting each other.
Figure 4:
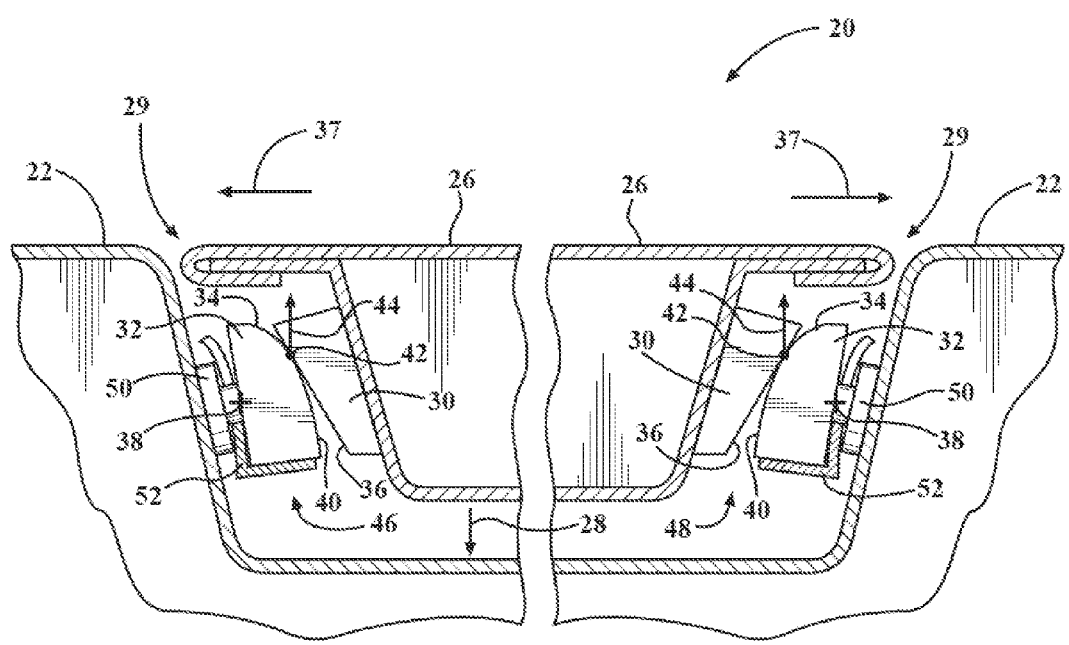
FIG. 4 is a schematic cross sectional view of the vehicle perpendicular to the view of FIG. 1 showing the closure panel in a closed position, with the rotatable wedge block engaged with the fixed wedge block and rotated about a rotation axis to move the fixed wedge block along a curved cam surface of the rotatable wedge block.

When the closure panel 26 is disposed in the closed position, a closure restraint system 29 interconnects the body 22 and the closure panel 26, and restricts lateral movement of the closure panel 26 relative to the body 22. Referring to FIGS. 2 through 4, the closure restraint system 29 includes a fixed wedge block 30 and a rotatable wedge block 32. The fixed wedge block 30 is attached to one of the body 22 or the closure panel 26, and the rotatable wedge block 32 is attached to the other of the body 22 and the closure panel 26. As shown in the Figures, the fixed wedge block 30 is attached to and moveable with the closure panel 26, and the rotatable wedge block 32 is attached to the body 22. However, it should be appreciated that the relative positions of the fixed wedge block 30 and the rotatable wedge block 32 may be reversed, with the fixed wedge block 30 attached to the body 22, and the rotatable wedge block 32 attached to and moveable with the closure panel 26.

The rotatable wedge block 32 includes a first contact surface 34, and the fixed wedge block 30 includes a second contact surface 36. The rotatable wedge block 32 and the fixed wedge block 30 engage each other along the first contact surface 34 and the second contact surface 36 respectively during the movement of the closure panel 26 relative to the body 22 between the open position and the closed position. The rotatable wedge block 32 and the fixed wedge block 30 engage each other to restrict lateral movement of the closure panel 26 relative to the body 22 in a direction transverse to the path 28, i.e., side to side movement relative to the path. More specifically, the first contact surface 34 and the second contact surface 36 are disposed in contacting engagement with each other when the fixed wedge block 30 and the rotatable wedge block 32 engage each other. The lateral movement in the direction transverse to the path 28 is generally shown by direction arrow 37. Preferably, at least one of the fixed wedge block 30 and the rotatable wedge block 32 includes an elastomeric material to limit noise therebetween when contacting each other. The elastomeric material may include any material capable of absorbing vibration, while still resisting relative movement, such as but not limited to a rubber material or the like.

The rotatable wedge block 32 is rotatable relative to the fixed wedge block 30 about a rotation axis 38 when engaged by the fixed wedge block 30. The rotation axis 38 is disposed approximately perpendicular to the path 28, and extends into and out of the page as shown in FIGS. 2 through 4. Accordingly, when contacted by the fixed wedge block 30, the rotatable wedge block 32 rotates about the rotation axis 38. At least one of the first contact surface 34 of the rotatable wedge block 32 and the second contact surface 36 of the fixed wedge block 30 defines a curved cam surface 40. The curved cam surface 40 is disposed perpendicular to the rotation axis 38 of the rotatable wedge block 32. As shown, the first contact surface 34 of the rotatable wedge block 32 defines the curved cam surface 40. However, it should be appreciated that the second contact surface 36 of the fixed wedge block 30 may alternatively define the curved cam surface 40. The fixed wedge block 30 is shown having a trapezoidal cross sectional shape perpendicular to the axis of rotation. The second contact surface 36 of the trapezoidal shape is configured to align the fixed wedge block 30 relative to the rotatable wedge block 32, and wedge the second contact surface 36 of the fixed wedge block 30 against the curved contact surface of the rotatable wedge block 32.

The curved cam surface 40 defines a convex shape perpendicular to the rotation axis 38 and relative to the fixed wedge block 30. The convex shape defines a variable distance between the curved cam surface 40 and the rotation axis 38. Referring to FIGS. 3 and 4, as the rotatable wedge block 32 rotates in response to engagement with the fixed wedge block 30, a point of contact 42 between the rotatable wedge block 32 and the fixed wedge block 30 moves along the curved cam surface 40. It should be appreciated that the point of contact 42 may more precisely be referred to as a line of contact that extends into the page as shown in FIGS. 3 and 4. The convex shape of the curved cam surface 40 is shaped to maintain a consistent separation between the closure panel 26 and the body 22 as the rotatable wedge block 32 rotates about the rotation axis 38, while engaged with the fixed wedge block 30 during the movement of the closure panel 26 along the path 28 relative to the body 22. Accordingly, due to the rotation of the rotatable wedge block 32 about the rotation axis 38 and the point of contact 42 between the rotatable wedge block 32 and the fixed wedge block 30 moving along the curved cam surface 40, the closure restraint system 29 is self-adjusting to accommodate different lateral positions of the closure panel 26 relative to the body 22. The convex shape of the curved cam surface 40 is also shaped to maintain a consistent resultant force 44 against the closure panel 26. The resultant force 44 resists movement of the closure panel 26 relative to the body 22 as the rotatable wedge block 32 rotates about the rotation axis 38, while engaged with the fixed wedge block 30 during the movement of the closure panel 26 along the path 28 relative to the body 22. Accordingly, due to the rotation of the rotatable wedge block 32 about the rotation axis 38 and the point of contact 42 between the rotatable wedge block 32 and the fixed wedge block 30 moving along the curved cam surface 40, the resultant force 44 does not significantly increase as the closure panel 26 nears the fully closed position shown in FIG. 4.

As shown in FIGS. 2 through 4, the closure restraint system 29 described above includes a first sub-system 46 and a second sub-system 48. Each of the first sub-system 46 and the second sub-system 48 operate as described above. More specifically, each of the first sub-system 46 and the second sub-system 48 include the fixed wedge block 30 and the rotatable wedge block 32 engaging each other during movement of the closure panel 26 relative to the body 22 to restrict lateral movement of the closure panel 26 relative to the body 22 in a direction transverse to the path 28 of movement. Each of the first sub-system 46 and the second sub-system 48 are disposed on opposing lateral sides of the closure panel 26, across a longitudinal axis of the vehicle 20, and operate to restrict lateral movement in one direction transverse to the path 28. As shown in FIGS. 2 through 4, the path 28 is aligned with the longitudinal axis of the vehicle 20. The first sub-system 46 and the second sub-system 48 operate to bias against each other to restrict lateral movement left and right of the longitudinal axis.

The closure restraint system 29 includes a mounting base 50 that is configured to attach the rotatable wedge block 32 to one of the body 22 or the closure panel 26 in spaced relationship relative thereto. As shown, the mounting base 50 attaches the rotatable wedge block 32 to the body 22. A backing plate 52 is attached to and interconnects the mounting base 50 and the rotatable wedge block 32. The backing plate 52 supports the rotatable wedge block 32. The backing plate 52 is shaped to allow rotation of the rotatable wedge block 32 about the rotation axis 38. As shown in FIGS. 3 and 4, the backing plate 52 includes an arcuate cross sectional shape perpendicular to the rotation axis 38 to allow the rotatable wedge block 32 to rotate about the rotation axis 38 relative to the backing plate 52. The rotatable wedge block 32 may be attached to the backing plate 52 in any suitable manner that allows the rotatable wedge block 32 to rotate about the rotation axis 38 relative to the backing plate 52.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
a body defining an opening;
a closure panel moveably attached to the body for movement along a path between an open position and a closed position;
a closure restraint system interconnecting the body and the closure panel, and restricting lateral movement of the closure panel relative to the body when the closure panel is disposed in the closed position, the closure restraint system including:
a fixed wedge block attached to one of the body or the closure panel, and a rotatable wedge block attached to the other of the body and the closure panel;
wherein the fixed wedge block and the rotatable wedge block engage each other during the movement of the closure panel relative to the body to restrict lateral movement of the closure panel relative to the body in a direction transverse to the path; and
wherein the rotatable wedge block is rotatable relative to the fixed wedge block about a rotation axis disposed perpendicular to the path when engaged by the fixed wedge block.

2. A vehicle as set forth in claim 1 wherein the rotatable wedge block includes a first contact surface and the fixed wedge block includes a second contact surface, and wherein the first contact surface and the second contact surface are disposed in contacting engagement with each other when the fixed wedge block and the rotatable wedge block engage each other.

3. A vehicle as set forth in claim 2 wherein at least one of the first contact surface and the second contact surface defines a curved cam surface disposed perpendicular to the rotation axis of the rotatable wedge block.

4. A vehicle as set forth in claim 3 wherein the curved cam surface is shaped to maintain a consistent separation between the closure panel and the body as the rotatable wedge block rotates about the rotation axis while engaged with the fixed wedge block during the movement of the closure panel along the path relative to the body.

5. A vehicle as set forth in claim 3 wherein the curved cam surface is shaped to maintain a consistent resultant force resisting movement of the closure panel relative to the body as the rotatable wedge block rotates about the rotation axis while engaged with the fixed wedge block during the movement of the closure panel along the path relative to the body.

6. A vehicle as set forth in claim 2 wherein the first contact surface of the rotatable wedge block defines the cam surface, and wherein the fixed wedge block includes at trapezoidal cross sectional shape perpendicular to the axis of rotation.

7. A vehicle as set forth in claim 1 wherein the closure restraint system includes a mounting base configured to attach the rotatable wedge block to one of the body or the closure panel in spaced relationship relative thereto.

8. A vehicle as set forth in claim 7 wherein the closure restraint system includes a backing plate attached to the mounting base and the rotatable wedge block and supporting the rotatable wedge block.

9. A vehicle as set forth in claim 8 wherein the backing plate is shaped to allow rotation of the rotatable wedge block about the rotation axis.

10. A vehicle as set forth in claim 9 wherein the backing plate includes an arcuate cross sectional shape perpendicular to the rotation axis.

11. A vehicle as set forth in claim 1 wherein the fixed wedge block is attached to the closure panel, and the rotatable wedge block is attached to the body.

12. A vehicle as set forth in claim 1 wherein the closure restraint system includes a first sub-system and a second sub-system disposed on opposing lateral sides of the closure panel.

13. A vehicle as set forth in claim 1 wherein at least one of the fixed wedge block and the rotatable wedge block include an elastomeric material.

14. A closure restraint system for interconnecting a body of a vehicle relative to a closure panel of the vehicle to restrict lateral movement of the closure panel relative to the body when the closure panel is disposed in a closed position, the closure restraint system comprising:
a rotatable wedge block having a first contact surface and configured for attachment to one of the body and the closure panel, and a fixed wedge block having a second contact surface and configured for attachment to the other of the body and the closure panel;
wherein the second contact surface of the fixed wedge block and the first contact surface of the rotatable wedge block engage each other during movement of the closure panel along a path relative to the body to restrict lateral movement of the closure panel relative to the body transverse to the path;
wherein the rotatable wedge block is rotatable relative to the fixed wedge block about a rotation axis disposed perpendicular to the path when engaged by the fixed wedge block;
wherein one of the first contact surface and the second contact surface defines a curved cam surface disposed perpendicular to the rotation axis and shaped to maintain a consistent resultant force directed resisting movement of the closure panel relative to the body as the rotatable wedge block rotates about the rotation axis.

15. A closure restraint system as set forth in claim 14 wherein the curved cam surface is shaped to maintain a consistent separation between the closure panel and the body as the rotatable wedge block rotates about the rotation axis while engaged with the fixed wedge block during the movement of the closure panel along the path relative to the body.

16. A closure restraint system as set forth in claim 14 wherein the first contact surface of the rotatable wedge block defines the cam surface, and wherein the fixed wedge block includes at trapezoidal cross sectional shape perpendicular to the axis of rotation.

17. A closure restraint system as set forth in claim 14 further comprising a mounting base configured to attach the rotatable wedge block to one of the body or the closure panel.

18. A closure restraint system as set forth in claim 17 further comprising a backing plate attached to the mounting base and the rotatable wedge block and supporting the rotatable wedge block.

19. A closure restraint system as set forth in claim 18 wherein the backing plate is shaped to allow rotation of the rotatable wedge block about the rotation axis.

20. A closure restraint system as set forth in claim 19 wherein the backing plate includes an arcuate cross sectional shape perpendicular to the rotation axis.

\* \* \* \* \*